United States Patent Office 3,100,162
Patented Aug. 6, 1963

3,100,162
ACTIVE MATERIAL FOR STORAGE BATTERIES AND METHOD OF MAKING SAME
Anthony Sabatino, Milwaukee, and Ernest J. Jackson, Racine, Wis., assignors to Globe-Union Inc., Milwaukee, Wis., a corporation of Wisconsin
No Drawing. Filed Dec. 7, 1959, Ser. No. 857,566
13 Claims. (Cl. 136—26)

This invention relates generally to the manufacture of lead-acid storage batteries and more particularly to an active paste material for battery plates and the method of making such material.

The cells of a conventional storage battery comprise a series of alternately arranged positive and negative plates immersed in sulfuric acid as an electrolyte. Prior to this invention, the standard method for manufacturing battery plates comprised the pasting of battery grids with a paste prepared by mixing lead oxide and sulfuric acid. This mixture forms a plastic paste as a result of the chemical action between the lead oxide and sulfuric acid wherein lead sulfate is formed. The paste is then pressed into the interstices of the grid structure and drys to form a hard, cohesive, cemented material which is readily retained in the grid.

The battery industry has long sought a method which avoids the use of sulfuric acid in the paste making operation because of its corrosive effect on equipment, the heat produced by the chemical reaction when mixed with lead oxide, and the irreversible hardening of the sulfuric paste in a short time creating storage problems and preventing regeneration of the paste condition. There has also been a desire for a simpler, quicker and more economical method of paste manufacture. While it is recognized that some non-acid pastes have been developed prior to this invention, none of such pastes have achieved any substantial degree of commercial acceptance due to the instability of such pastes resulting in a substantial reduction in consistency when subjected to the handling required to apply the paste to a battery grid.

The primary object of this invention, therefore, is to provide a method of making a stable battery paste by a continuous operation which does not use sulfuric acid with its attendant disadvantages and which, at the same time, permits closer control of conditions than heretofore possible, to thereby produce pastes with invariant properties. Our improved method permits making plates which are consistently uniform without some plates containing excess amounts of lead oxide and thus considerable cost savings can be realized.

Another object is to provide a method which lends itself to a continuous as opposed to a batch process of manufacture and which can be carried out in a closed system by automatic machinery with a minimum amount of handling.

Another object is to provide a method which is devoid of any complex and relatively uncontrollable and irreversible chemical reactions to thereby permit storage and shipment of the material as desired.

The method embodying our invention involves two basic steps. The first step is that of mixing a slurry of lead oxide and the second is the foaming of the slurry by aeration with a suitable gas to thereby redistribute the water in the slurry to produce a paste of the desired characteristics of density and consistency.

The slurry is made from a paste-like mixture of (1) lead oxide, (2) water, (3) a small amount of a foam producing agent, and (4) a small amount of a foam stabilizing agent added to aid in the foaming step which follows. As indicated in the specific examples disclosed hereinafter, in the preferred embodiments the water in the slurry is not more than about 30% by weight of the mixture and the foam producing agent and foam stabilizing agent are each less than 1% by weight of the mixture. The paste-like mixture is thoroughly intermixed in any suitable manner such as by a homogenizing type mixer producing a high rate of shear to convert such mixture to a liquid slurry. No specific procedure must be followed in making the slurry, however, it has been found that one of two alternative procedures is preferable depending on the circumstances. The first such procedure is to first mix the water and the stabilizing agent and then to add a dry powdered mixture of lead oxide and foam producing agent to the liquid in the mixer. The second is to simply make a dry mixture of lead oxide, stabilizing agent and foam producing agent and add it to the water in the mixer.

The lead oxide used in making a battery paste is commercially available in various forms. The particular type used will depend on whether a positive or negative plate is to be made and upon other variables (such as particle size and percentage of free lead) well known to those skilled in the art.

Similarly, the foam producing agent and stabilizing agent selected for use in mixing the slurry may be of various types. Such agents, of course, must be compatible with each other and not form any undesirable compounds with sulfuric acid in the finished battery. Generally speaking, it has been found that both anionic and non-ionic type foam producing agents and fluorinated agents are suitable for use in the process. However, anionic types are preferred. Specific examples of foam producing agents used satisfactorily in the process are sodium lauryl sulfate, the sodium salt of an alkyl-naphthalene sulfuric acid and fluoroalkyl phosphonate.

The stabilizing agent which serves to stabilize the slurry before it is foamed and to stabilize the paste after foaming may also be of various types. Specific types which have proven satisfactory are sodium carboxymethylcellulose (also known as sodium cellulose glycolate) and polyvinyl alcohol.

The slurry, as prepared above, is an essentially stable product to thus permit its storage for relatively long periods of time. The main consideration during storage is the evaporation of water from the slurry which will have an effect on the final product if such water is not replaced. During the mixing of the slurry there are no uncontrollable and irreversible chemical reactions occurring which give off heat, etc. and cause corrosion and safety problems as is the case with the old sulfuric acid method.

The second major step is the aeration of the oxide slurry with a suitable gas to foam the slurry and thereby produce a battery paste of the desired characteristics. Broadly speaking, this is accomplished by bringing the materials in the slurry and a suitable gas into intimate contact with each other. The slurry can be aerated by the use of any suitable apparatus such as by pumping the liquid slurry into a mixing chamber into which a suitable gas is introduced under pressure by means of a plurality of jets mounted in the wall of the chamber. This can be a continuous process wherein the material is pumped through the aerating chamber and is mixed as it passes therethrough.

During this step the foam producing agent in the slurry serves to depress the surface tension of the water and thus facilitate the formation of gas bubbles in the paste. The foam stabilizing agent in the slurry serves to modify the surfaces of the lead oxide particles and causes them to adhere in a uniform pattern to the gas bubbles which are formed. The result is a foamed paste in which the water content has been thoroughly and uniformly redistributed (in the form of bubbles) to provide a paste having a predetermined and accurately controlled density and consistency suitable for application to a battery grid. By virtue of the aeration step described above, a paste having improved characteristics of physical stability is produced which will not lose its consistency upon subsequent mechanical manipulation during application to a battery grid by suitable grid pasting machinery.

There are various gases and mixtures of gases which may be used to foam the slurry. It has been found, however, that best results are obtained by the use of a gas containing a substantial proportion of carbon dioxide.

Having indicated in a general way the nature and purpose of the invention, the following specific examples are offered as illustrative embodiments:

*Example I*

The slurry was made by preparing 100 grams of a 2.5% solution of sodium carboxymethylcellulose in water. To this solution was added: (1) 1.0 lb. of leady litharge (containing about 25% free lead and including expanders for making negative battery plates), (2) 0.3 gram of sodium lauryl sulfate, and (3) 20 grams of water. The slurry was thoroughly intermixed and then aerated with carbon dioxide gas to produce a foamed paste for application to a battery grid.

*Example II*

The slurry was made by preparing 100 grams of a 1.35% solution of sodium carboxymethylcellulose in water. To this solution was added: (1) 1.0 lb. of leady litharge (containing about 25% free lead and including expanders for making negative battery plates), (2) 0.3 gram of sodium lauryl sulfate, and (3) 5.0 grams of water. The slurry was thoroughly intermixed and then aerated with carbon dioxide gas to produce a foamed paste for application to a battery grid.

*Example III*

The slurry was made by preparing a dry mixture of: (1) 1.0 lb. of leady litharge (containing about 25% free lead and including expanders for making negative battery plates, (2) 1.8 grams of sodium carboxymethylcellulose, and (3) .1 gram of sodium lauryl sulfate. The dry components were then added to 90 grams of water and thoroughly intermixed therewith. The slurry was then aerated with carbon dioxide gas to produce a foamed paste for application to a battery grid.

*Example IV*

The slurry was made by taking 90 grams of water and adding to it: (1) 1.0 lb. of leady litharge (containing about 25% free lead and including expanders for making negative battery plates), (2) 1.8 grams of sodium carboxymethylcellulose, (3) 0.1 gram of sodium lauryl sulfate, and (4) 0.42 gram of cellulose fiber. The slurry was thoroughly intermixed and then aerated with carbon dioxide gas to produce a foamed paste for application to a battery grid.

*Example V*

The slurry was made by preparing 120 grams of a 4.4% solution of sodium carboxymethylcellulose in water. To this solution was added: (1) 1.0 lb. of sublimed litharge (containing no expanders for making positive battery plates), (2) 0.5 gram of sodium lauryl sulfate, and (3) 8.0 grams of water. The slurry was thoroughly intermixed and then aerated with carbon dioxide gas to produce a foamed paste for application to a battery grid.

*Example VI*

The slurry was made by preparing 90 grams of a 4.0% solution of sodium carboxymethylcellulose in water. To this solution was added: (1) 1.0 lb. of leady litharge (containing about 25% free lead and no expanders for making positive battery plates), (2) 0.3 gram of the sodium salt of an alkylnaphthalene sulfonic acid, and (3) 1.33 grams of water. The slurry was thoroughly intermixed and then aerated with carbon dioxide gas to produce a foamed paste for application to a battery grid.

*Example VII*

The slurry was made by preparing 120 grams of a water solution containing 4.4% sodium carboxymethylcellulose and 1.0% polyvinyl alcohol. To this solution is added: 0.1 gram of sodium lauryl sulfate and 1.0 lb. of leady litharge (containing about 25% free lead and no expanders for making positive battery plates). The slurry was thoroughly intermixed and then aerated with carbon dioxide gas to produce a foamed paste for application to a battery grid.

As stated previously, various gases and mixtures thereof have been used successfully in the practice of our invention. In addition to the use of substantially pure carbon dioxide gas as indicated in the specific examples listed above, it has been found that various mixtures of carbon dioxide with other gases can be employed with satisfactory results. Specific examples of such other gases (used with carbon dioxide) are argon, nitrogen, oxygen, and air. For best results the percentage of carbon dioxide in the mixture should be over 50 percent but it has been found that some foaming of the slurry is produced by aerating with a gas containing as little as about 5 percent carbon dioxide. The particular percentage of carbon dioxide to be used will vary with a number of factors such as the desired consistency of the paste to be manufactured and the constituency of the slurry to be foamed. Generally speaking, it has been found that as the percentage of carbon dioxide in the aerating gas is increased the more thorough will be the redistribution of water in the paste to thereby produce a paste having a more sand-like and a less fluid-like consistency.

From the description of the various steps of our improved process, it will be appreciated that the method lends itself to a continuous as opposed to a batch process of manufacture typical of prior methods. The liquid slurry can be readily stored and pumped (in a continuous process) from the slurry mixer to the inlet of the aeration mixer through such mixer and then to the machine utilized for applying the finished paste to the grids of a battery plate. The system can be completely closed to prevent the introduction of foreign materials and is readily adapted for continuous and automatic processing under accurate control with a minimum amount of handling. The foamed paste can be varied in form from a pseudo-dry sand to a material very much like conventional paste. The consistency desired will depend largely on the type of machinery used for applying the paste to the grids. The consistency can, for example, be varied by varying the proportion of water in the oxide slurry and/or the percentage of $CO_2$ in the aerating gas. In any event, the consistency will remain relatively constant during subsequent handling.

After the paste is applied to the battery grids they are dried. As the moisture is driven off the gas bubbles are ruptured leaving a uniform network of air spaces in the plates which form a natural network of channels into which the sulfuric acid in the battery can freely penetrate during operation of the finished battery. It has been found that the plates made by this process provide a higher capacity at high rates of discharge due to the speed in which the sulfuric acid can penetrate into the plates and make contact with the active material therein.

Although several embodiments of the present invention have been illustrated and described, it will be apparent to those skilled in the art that various changes and modifications may be made therein without departing from the spirit of the invention or from the scope of the appended claims.

We claim:
1. The method of making battery paste comprising the steps of:
mixing a slurry of lead oxide and water with small amounts of a foam producing agent and a water soluble foam stabilizing agent added thereto, said slurry containing not more than about 30% water by weight, less than about 1% foam producing agent by weight, and less than about 1% foam stabilizing agent by weight;

and redistributing the water in said slurry by aeration with a gas, said gas comprising from about 10% to 100% carbon dioxide with any gas used in a mixture with carbon dioxide being substantially inert to said slurry;

said foam producing agent adapted to depress the surface tension of the water and thus facilitate the formation of gas bubbles in the mixture, said foam stabilizing agent adapted to modify the surfaces of the lead oxide particles and cause them to adhere in a uniform pattern to the gas bubbles in the mixture, said foam stabilizing agent and foam producing agent being compatible with each other and with the sulfuric acid in a finished battery.

2. The method according to claim 1 in which said foam stabilizing agent is sodium carboxymethylcellulose.

3. The method according to claim 1 in which said foam stabilizing agent is polyvinyl alcohol.

4. The method according to claim 1 in which said gas comprises carbon dioxide and air.

5. The method according to claim 1 in which said gas comprises carbon dioxide and oxygen.

6. The method according to claim 1 in which said gas comprises carbon dioxide and argon.

7. The method according to claim 1 in which said gas comprises carbon dioxide and nitrogen.

8. The method of making battery paste comprising the steps of:

mixing a slurry of lead oxide and water with small amounts of a foam producing agent and a water soluble foam stabilizing agent added thereto;

redistributing the water in said slurry by aeration with a gas, said gas comprising from about 10% to 100% carbon dioxide with any gas used in a mixture with carbon dioxide being substantially inert to said slurry;

said water comprising about 15% to about 30% by weight of the paste;

said foam stabilizing agent comprising about .20% to about 1.00% by weight of the paste;

said foam producing agent comprising about .013% to about 1.00% by weight of the paste;

said foam producing agent adapted to depress the surface tension of the water and thus facilitate the formation of gas bubbles in the mixture, said foam stabilizing agent adapted to modify the surfaces of the lead oxide particles and cause them to adhere in a uniform pattern to the gas bubbles in the mixture, said foam stabilizing agent and foam producing agent being compatible with each other and with the sulfuric acid in a finished battery.

9. A battery paste for applying to battery plate grids comprising:

a foamed mixture of lead oxide, water, a water soluble foam stabilizing agent, and a foam producing agent;

said water comprising about 15% to about 30% by weight of the mixture;

said foam stabilizing agent comprising about .20% to about 1.00% by weight of the mixture;

said foam producing agent comprising about .013% to about 1.00% by weight of the mixture;

and bubbles of gas interspersed throughout the mixture, said gas comprising from about 10% to 100% carbon dioxide with any gas used with carbon dioxide being substantially inert to said mixture;

said foam producing agent adapted to depress the surface tension of the water and thus facilitate the formation of gas bubbles in the mixture, said foam stabilizing agent adapted to modify the surfaces of the lead oxide particles and cause them to adhere in a uniform pattern to the gas bubbles in the mixture, said foam stabilizing agent and foam producing agent being compatible with each other and with the sulfuric acid in a finished battery.

10. A battery paste according to claim 9 in which said foam stabilizing agent is sodium carboxymethylcellulose.

11. A battery paste according to claim 9 in which said foam stabilizing agent is polyvinyl alcohol.

12. The method of making battery paste comprising the steps of:

mixing a slurry of lead oxide and water with small amounts of a foam producing agent and a water soluble foam stabilizing agent added thereto, said foam producing agent being less than about 1% by weight of the mixture, said slurry containing not more than about 30% water by weight, said foam stabilizing agent and foam producing agent being compatible with each other and with the sulphuric acid in a finished battery; and redistributing the water in said slurry by aeration with a gas, said gas comprising from about 10% to 100% carbon dioxide, with any gas used in a mixture with carbon dioxide being substantially inert to said slurry.

13. A battery paste for applying to battery plate grids comprising:

a mixture of lead oxide, water, a water soluble foam stabilizing agent, and a foam producing agent, said foam producing agent being less than about 1% by weight of the mixture, the water in said mixture comprising not more than about 30% by weight of the mixture, said foam stabilizing agent and foam producing agent being of a small amount and compatible with each other and with the sulphuric acid in a finished battery;

and bubbles of gas interspersed throughout the mixture, said gas comprising from about 10% to 100% carbon dioxide with any gas used with carbon dioxide being substantially inert to said mixture.

References Cited in the file of this patent

UNITED STATES PATENTS

| | | |
|---|---|---|
| 1,907,982 | King | May 9, 1933 |
| 1,919,730 | Koenig et al. | July 25, 1933 |
| 2,567,950 | Stauffer | Sept. 18, 1951 |
| 2,576,318 | Toulmin | Nov. 27, 1951 |
| 2,674,642 | Agruss et al. | Apr. 6, 1954 |
| 2,801,274 | Bethe | July 30, 1957 |
| 2,809,172 | Keen | Oct. 8, 1957 |
| 2,920,128 | Scheichl | Jan. 5, 1960 |